Jan. 31, 1950 V. B. KING 2,495,933
BRAKE APPLYING MECHANISM FOR ROCKING WHEEL VEHICLES
Filed May 12, 1947 3 Sheets-Sheet 1
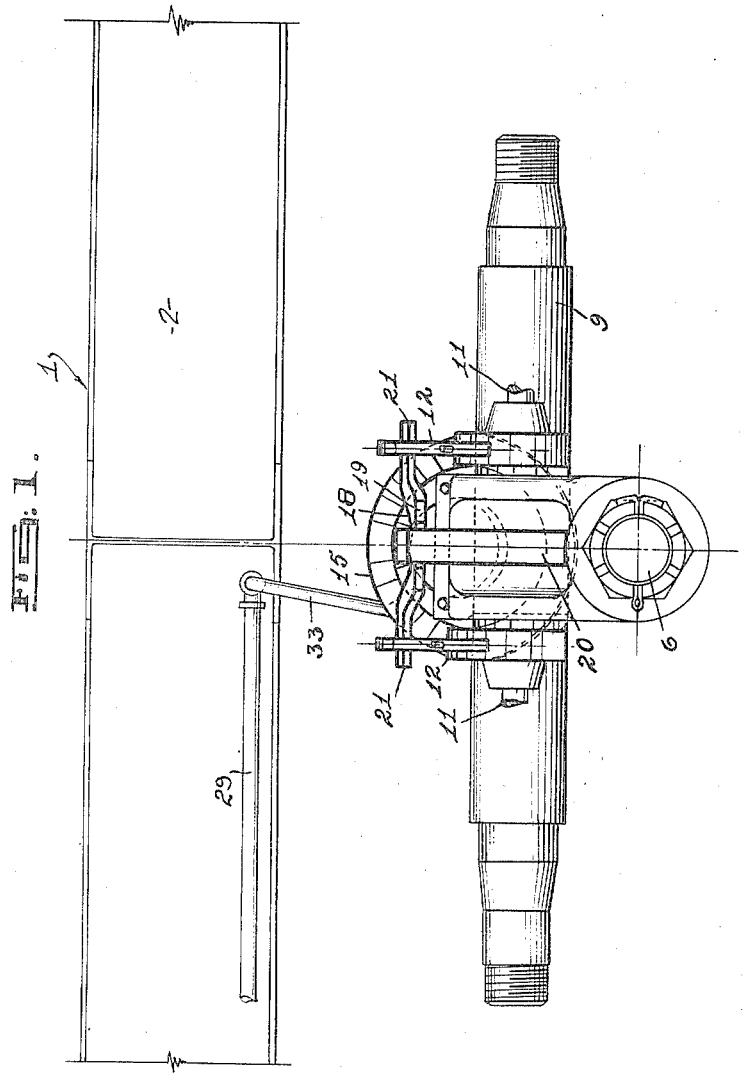
INVENTOR,
VERNON B. KING,
BY
ATTORNEY

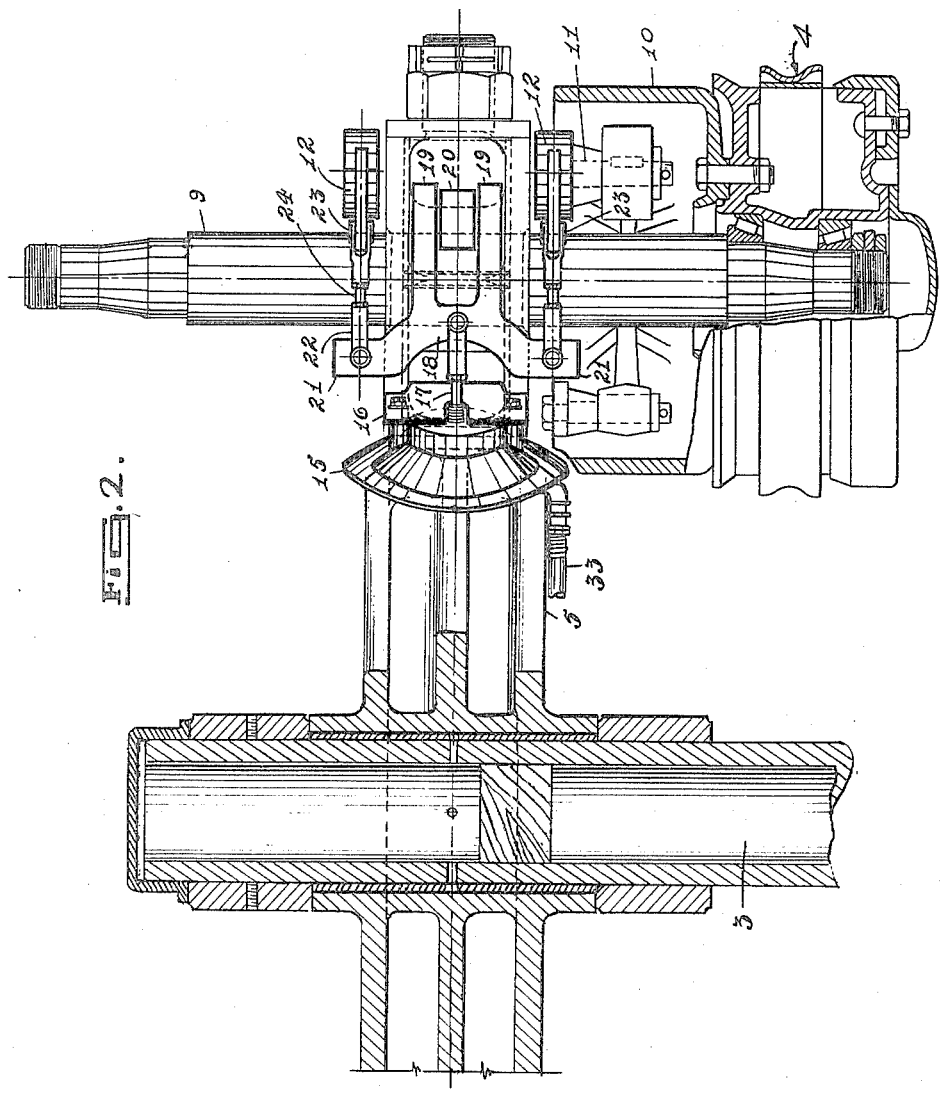

Jan. 31, 1950 V. B. KING 2,495,933
BRAKE APPLYING MECHANISM FOR ROCKING WHEEL VEHICLES
Filed May 12, 1947 3 Sheets-Sheet 3
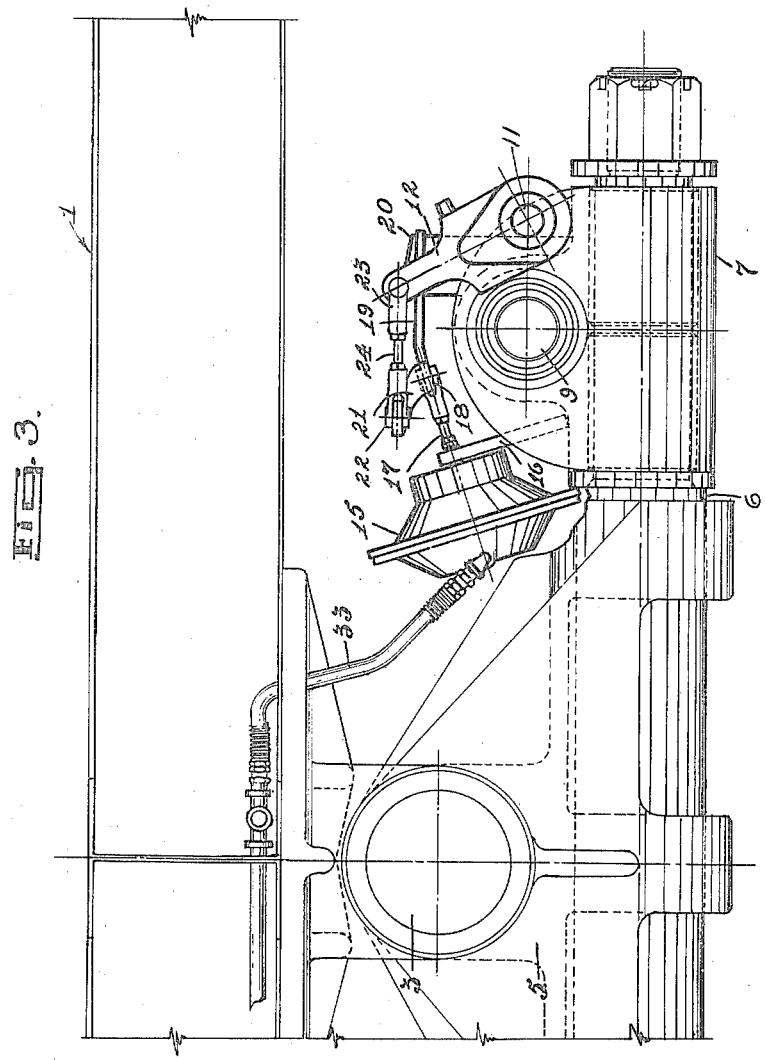
INVENTOR,
VERNON B. KING,
BY
ATTORNEY Patented Jan. 31, 1950

2,495,933

UNITED STATES PATENT OFFICE 2,495,933

BRAKE APPLYING MECHANISM FOR ROCKING WHEEL VEHICLES

Vernon B. King, Woodstock, Ontario, Canada

Application May 12, 1947, Serial No. 747,568
In Canada February 23, 1945

5 Claims. (Cl. 188—204)

The invention relates to improvements in brake applying mechanism for rocking wheel vehicles, as described in the present specification and shown in the accompanying drawings that form a part of the same.

The invention concerns chiefly that type of vehicle, such as heavy duty trailers and the like, in which the rear wheels are arranged in sets positioned respectively forwardly and rearwardly of the main transverse supporting shaft and so mounted as to rock about a transverse axis, while the wheels of each set are adapted for rocking movement about a longitudinal axis concurrently with the movement of the sets about the transverse axis.

In such vehicles constructed to accommodate extremely heavy loads it is absolutely essential that adequate braking effort be applied to each wheel and also that the braking power applied to each wheel be precisely equal to that applied to every other wheel in order that the vehicle may be slowed or brought to a stop without danger of skidding, or shifting of the load.

Heretofore in universal rocking wheel vehicles it has been the custom to provide a single power applying means such as a pneumatic or vacuum operated cylinder and piston assembly, or assemblies, common to all of the wheels and to connect such power applying means to the various wheels by means of cables, or by a system of rigid rods, links, cross shafts and levers, but such heretofore known means has not proven effective, due, in the case of the use of cables to the fact that the cables will in time stretch variously and thus lose their quality, and in the case of the rigid rod systems to the fact that it is impossible to compensate for the various rocking movements of the wheels and at the same time maintain positive connection among the operating parts. Furthermore, due to the inherent mechanical inefficiency of the linkage connection between the respective brakes and the power applying means a very great percentage of the power is lost. Another disadvantage of the use of long multi-link or rod connections is that such connections are frequently rendered inoperative due to accumulation of ice or other foreign matter thereon.

The present invention overcomes the disadvantages of heretofore known brake applying means for multi-rocking-wheel vehicles by providing a power cylinder for each pair of transversely aligned wheel brakes of each set, mounted on the movable axle supporting trunnions fore and aft of the main transverse shaft so that each power cylinder is always in the same physical relation to the two wheel brakes which it serves, regardless of the rocking movement of the wheels, and so close thereto that the operating connection with the brakes is extremely short and rigid and cannot easily be interfered with and will remain as set indefinitely. The connection between the rockable cylinders and the main power supply means offers no problem such as the long link connection between the main cylinder and the individual brakes in the heretofore known braking means but simply consists of a flexible hose to supply air under pressure to the power cylinders from the compressor mounted in the truck trailer.

The main objects of the present invention are to provide brake applying and equalizing mechanism of simple, sturdy and economical nature which will positively insure equal braking effort at all wheels simultaneously regardless of their positions; to provide brake applying mechanism which is readily accessible and which may be easily detached from the trunnions for repair, or other purposes, to reduce to a minimum the tare weight of the vehicle by the elimination of numerous lengthy rods, links and other parts and thereby make for a corresponding increase in the pay load, and to provide brake applying means wherein the full force of the power medium is attainable for the desired purpose.

With the above and other objects in view the invention consists in the novel features of construction, arrangements and combinations of parts described in the present specification and more particularly pointed out in the claims for novelty following.

In describing the invention reference will be made to the accompanying drawings, in which:

Figure 1 is an end view in elevation of a mechanism according to the invention when looking towards one end of a walking beam.

Figure 2 is a plan view of one end of a walking beam and the brake applying mechanism for one pair of wheels.

Figure 3 is a side view in elevation of the structure shown in Figure 2.

Like numerals of reference indicate corresponding parts in the various figures.

Referring specifically to the drawings, mounted in brackets carried by the main frame of a vehicle, near the rear end thereof, and preferably directly beneath the intermediate cross member 2 is a transversely extending shaft 3 which forms the main support for the running gear, which latter may comprise dual-tire wheels 4, mounted for transverse and longitudinal rocking movement in the manner to be described.

The shaft 3 has mounted near each of its ends, that is at each side of the vehicle, a housing or bracket 5, which is adapted for rocking movement about the shaft, and each housing extends longitudinally of the vehicle fore and aft of the shaft 3 and is adapted to carry a walking beam 6 which extends outwardly beyond each end of its housing.

Mounted on each of the walking beams 6 beyond the ends of the housing 5 is a trunnion bracket 7 adapted for rocking movement about the walking beam, or shaft, 6 and each of said trunnion brackets has a transverse bore forming a bearing for an axle 9, of which latter there are four in all, two located fore of the transverse shaft 3 in longitudinally aligned relation to one another and two located aft of said transverse shaft in longitudinally aligned relation to one another.

Mounted on each end of each of the transverse axles 9 is a dual-tire wheel 4.

Each dual-tire wheel is provided with a brake assembly designated generally by the numeral 10, which includes a brake drum provided with the usual expanding brake shoes which are adapted to be expanded through the operation of a cam shaft 11 in the manner commonly known. As the construction and operation of the brake assembly is well known it is not described in detail herein.

Positioned at each side of each trunnion 7 at the side of the associated axle 9 nearest the end of the corresponding walking beam, is a brake slack-adjusting lever 12, keyed at its lower end to the shaft 11 from the wheel brake, and extending upwardly, each brake adjuster lever being connected to a corresponding shaft 11 whose other end carries a cam which is adapted to work against the brake shoe wear plates to force the brake linings against the brake drums on the outward movement of the brake slack-adjuster lever 12.

Mounted on each side of the trunnion 7 at the inner ends thereof and movable therewith is a power cylinder 15 individual to the two dual-tire wheels carried by the associated axle 9. These cylinders may be secured to the associated trunnion brackets in any desired manner, as for instance by means of brackets 16 suitably secured by welding, bolts, or other means to the trunnion brackets, and bolted to the cylinders, and such cylinders are provided with interior diaphragms (not shown in the drawings as the construction and function thereof is considered to be well known) adapted to act on outwardly extending piston rods 17, of which latter there is one for each cylinder, extending towards the associated set of wheels.

18 are cross members, or yokes, of which there are four, one in advance of each cylinder piston rod 17, and each having pivotal connection at its transverse centre with the outer end of the associated piston rod whereby all of said yokes will be moved coincidently in like directions longitudinally of the walking beams upon the movement of the piston rods. The yokes 18 are each provided with forwardly extending parallel legs 19 which extend outwardly towards the corresponding ends of the associated walking beams.

Guide blocks 20 rigidly secured to the respective trunnion brackets 7 and extending upwardly therefrom between the legs of the respective yokes provide means for holding the yokes to true movement longitudinally of the walking beams. The legs 19 of the yokes 18 are spaced slightly greater than the width of the blocks 20 which extend upwardly therebetween so as to permit of slight lateral movement of the yokes whereby in the event of a small variance in the clearance between one brake lining and its brake drum and that of the brake lining and the drum of the associated pair of brakes the yoke, and the toggle mechanism of which the yoke forms part, will move to compensate for such variance and thus automatically take up the slack and thereby positively insure equalization of the braking effort.

The closed ends of the respective yokes 18 are provided with upwardly curved laterally extending portions 21 projecting at each side beyond the sides of the trunnion brackets 7 and these projecting portions, or arms, have pivotal connection with longitudinally inflexible members which extend outwardly and are pivotally connected to the top ends of the brake slack-adjuster levers 12 whereby movement of the yokes 18 through the movement of the piston rods 17 will cause coincident movement of the said levers and will thus rotate the respective shafts controlling the brake shoes to cause expansion of the latter, or permit of contraction thereof, according to the direction of movement of the piston rods.

The connections between the yokes, or cross members, 18 and the top ends of the associated brake slack-adjuster levers 12 each comprises a clevis 22 carried by each of the ends 21 of said members, a clevis 23 carried by each of the slack-adjuster levers, and a rod 24 oppositely threaded at opposite ends and screwing into the opposing interiorly threaded ends of said clevises whereby to permit of the adjustment of the stroke of the slack-adjuster levers when such adjustment is required.

It will be apparent that when the piston rods are moved forwardly through the action of the power medium in the cylinders 15, the various members 18 will be moved outwardly simultaneously and thereby cause rotation of the levers 12 and the shafts 11, which results in the cams operating the brake shoes in a manner to cause expansion thereof, and upon release of the pressure the brake shoes will be freed. As the connections between the piston rods and the cross members 18 and the connections between the ends of the said members 18 and the brake slack-adjuster levers are pivotal it will be seen that a toggle mechanism individual to each set of brakes is provided and that due to the clearance between the legs 19 and the associated guide blocks 20 this toggle mechanism will move to compensate for any variance in clearance between the one brake lining and the associated brake drum and the other brake lining and brake drum of the same pair of brakes.

While the particular means for applying power to the piston rods may vary according to desire the means shown and described herein has been found to give the best results.

25 and 26 are reservoirs, located one at each side of the vehicle and suitably supported from the frame of the vehicle. Pipes 27 and 28 leading from the source of compressed air to the respective reservoirs provide means for supplying air to said reservoirs.

Pipes 29 and 30 leading from the respective reservoirs through suitable emergency relay valves 31 and 32 provide means for supplying air under compression from the reservoirs to the fore and aft pairs of cylinders 15 respectively, the pipe 29 having connection with the interiors of the respective fore cylinders by means of flexible hose members 33, and the pipe 30 having connection with the interiors of the aft cylinders by means of flexible hose members 34. The flexible connections between the rigid pipes 29 and 30 and the associated cylinders permit of free movement of the cylinders coincident with the rocking movements of the various sets of wheels.

In the operation of the invention the power medium from the main cylinder or source of power is supplied to the individual cylinders 15 by the application of the brake applying means operable by the driver of the vehicle thus causing the piston rods 17 to be moved outwardly, and as these rods are pivotally connected to the transverse centres of the yokes 18 these yokes will be moved outwardly away from the cylinders and will cause the top ends of the levers 12 to be swung outwardly also. Such outward movement of the levers will cause rotation of the shafts 11 in a direction to move the brake shoe cams to cause application of the brakes. Should there be any variance in the clearance between the lining and drum of one brake and the lining and drum of the other brake of an associated pair of brakes the clearance between the legs 19 of the associated yoke and the stationary guide block 20 will permit of the toggle mechanism, owing to the pivotal connections between the piston and the levers 12, moving towards the side on which there is the greatest clearance sufficiently to allow application of the brake on that side simultaneously with the application of the other brake.

It is obvious that the pressure to the various cylinders will be supplied and released simultaneously and that due to the fact that each pair of wheels has its own cylinder movable therewith, with an extremely short brake operating connection between the individual power cylinders and the associated brake shoes the full pressure of the brake applying medium will be applied to the various brake shoes simultaneously and evenly, without loss of power.

While I have illustrated and described the present preferred form of construction for carrying out my invention, this is capable of variation and modification without departing from the spirit of the invention. I, therefore, do not wish to be limited to the precise details of construction set forth, but desire to avail myself of such variations and modifications as come within the scope of the appended claims.

What I claim is:

1. Brake applying and equalizing means for a wheeled vehicle, including brakes and slack adjusting levers respective thereto, a yoke comprising a rigid cross member and a bifurcate longitudinally extending part, rods pivotally connected at their one ends to said cross member near opposite ends of the latter and at their other ends having connection with said slack adjusting levers, driven means reciprocable longitudinally of the vehicle and having connection with said cross member in the transverse centre of the latter for moving said yoke lengthwise of the vehicle to impart rotary movement to said slack adjusting levers, and a fixed block loosely extending into said bifurcate part and cooperating therewith to limit the turning movement of said yoke.

2. Brake applying and equalizing means for a wheeled vehicle, including brakes and slack adjusting levers respective thereto, a yoke reciprocable longitudinally of the vehicle and including a cross member spaced from said slack adjusting levers, rigid means pivotally connected at their one ends to the respective ends of said cross member and at their other ends being pivotally connected to said slack adjusting levers respectively, said yoke having a pair of spaced parallel legs extending outwardly from said cross member towards said slack adjusting levers, a fixed guide block extending upwardly between said legs, said guide block being spaced from said legs at each side thereof to permit of limited turning movement of said yoke, and driven means having pivoted connection with said cross member in the transverse centre of the latter for reciprocating said yoke.

3. Brake applying and equalizing means according to claim 2, in which the point of connection between said driven means and said cross member is forwardly of and on a lower plane than the points of connection between said cross member and said rigid means connecting said cross member and said slack adjusting levers.

4. Brake applying and equalizing means according to claim 2, in which said legs are on a lower plane than said rigid connections between said cross member and said slack adjusting levers.

5. Brake applying and equalizing means for a wheeled vehicle, including brakes and slack adjusting levers individual thereto, a fixed upright between said slack adjusting levers, said upright presenting flat outer sides, a yoke reciprocable longitudinally of the vehicle and comprising a rigid cross member and an intermediate longitudinally slotted part adapted to receive said upright with the inner edges of said slotted part paralleling the flat sides of said upright and spaced therefrom, rods having pivotal connection with said cross member near the ends of the latter and with the respective slack adjusting levers, and means for reciprocating said yoke to cause rotary movement of said slack adjusting levers.

VERNON B. KING.

REFERENCES CITED

The following references are of record in the file of this patent:

UNITED STATES PATENTS

| Number | Name | Date |
| --- | --- | --- |
| 1,587,999 | Andel | June 8, 1926 |
| 1,681,518 | Compton | Aug. 21, 1928 |
| 1,762,915 | Danis | June 10, 1930 |
| 2,343,872 | Low | Mar. 14, 1944 |

FOREIGN PATENTS

| Number | Country | Date |
| --- | --- | --- |
| 321,212 | Italy | Sept. 27, 1934 |